MULTIVIBRATOR FREQUENCY MODULATOR
Filed Dec. 16, 1963
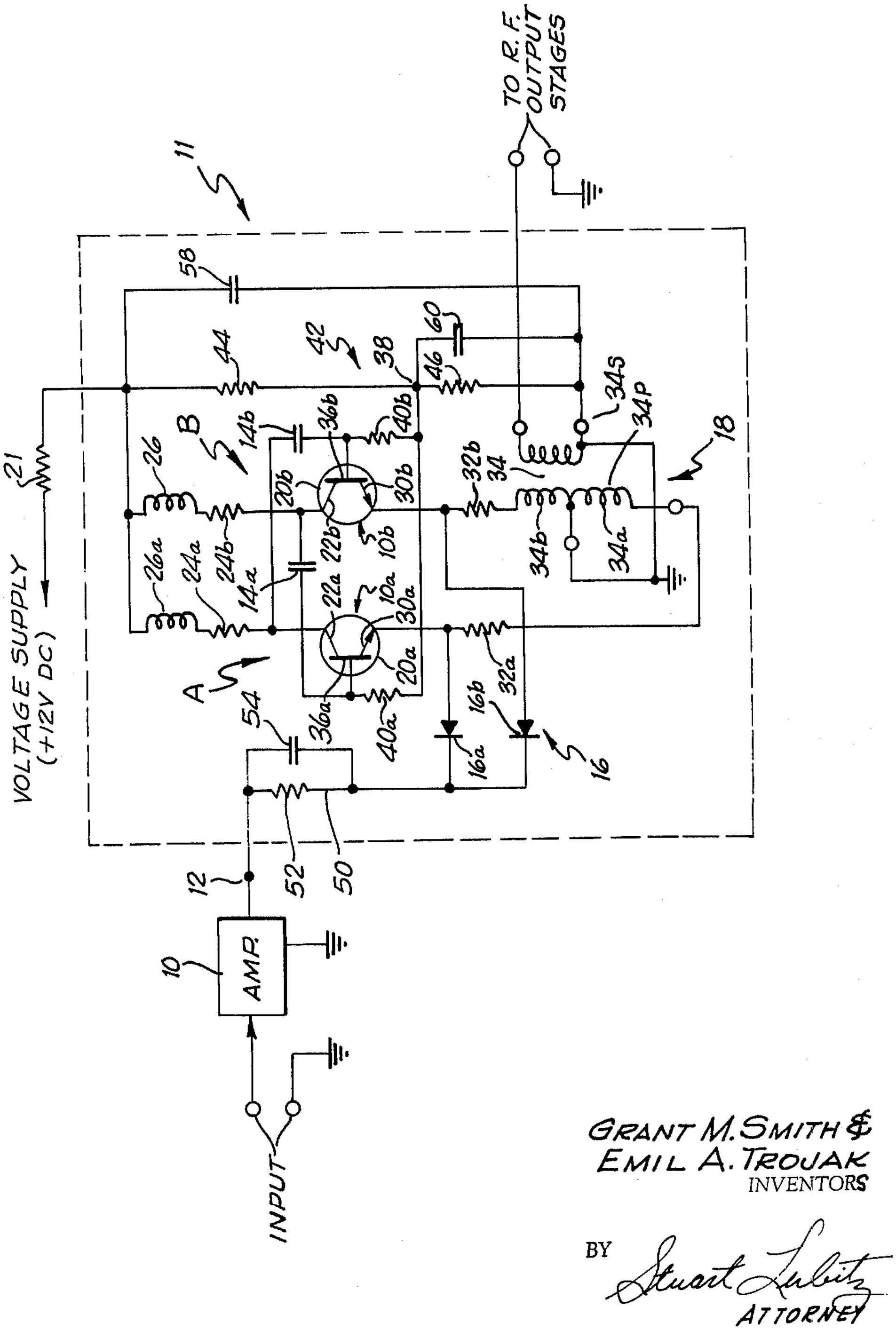
GRANT M. SMITH &
EMIL A. TROJAK
INVENTORS
BY Stuart Lubitz
ATTORNEY 3,263,189

MULTIVIBRATOR FREQUENCY MODULATOR

Grant M. Smith, Cupertino, and Emil A. Trojak, Palo Alto, Calif., assignors to Ampex Corporation, Redwood City, Calif., a corporation of California Filed Dec. 16, 1963, Ser. No. 331,012
4 Claims. (Cl. 332—24)

This invention relates to a modulator system and more particularly to a multivibrator modulator that operates in a push-pull fashion to minimize feedthrough.

The process of modulation in general involves producing a composite waveform, some characteristic of which varies in accordance with the instantaneous value of the input signal or wave called the modulating signal or wave. In frequency modulation or FM, the instantaneous frequency of the signal to be modulated, which is ordinarily referred to as the carrier wave, is caused to depart from its initial frequency by an amount proportional to the instantaneous value of the modulating signal. Television or other wideband tape recording systems normally employ a frequency modulated system to record the video or other signal on a magnetic tape. In the frequency modulation system, the modulating signal (i.e., the video or other wideband signal) either directly modulates a multivibrator operating at the carrier frequency or modulates a high frequency oscillator which is then heterodyned to provide the signal to be recorded. The carrier frequency is slightly higher than the maximum frequency of the video or other wideband signal, and the ratio of the change or deviation of the carrier corresponding to the maximum modulating frequency is such that the information transmitted by the frequency modulated signal is effectively contained in the carrier frequency component in the first upper and lower sideband components.

The direct modulation system using a freely oscillating multivibrator is simpler than the heterodyne modulation system, but it is subject to certain problems. In this connection, a multivibrator tends to be unstable and/or nonlinear when the frequency thereof is varied over a wide range. More important, since the frequency of the multivibrator is just above the highest modulating frequency there is a tendency for the higher frequencies of the modulating signal to feed through the multivibrator and combine with the frequency modulating signal thereby causing a pattern of interference that may be referred to as feedthrough.

Heterodyne type modulators permit partial control of the feedthrough of the modulating signal, but are subject to frequency drift harmonic distortion and intermodulation effects.

It is the object of the present invention to provide a multivibrator type modulator in which feedthrough of the modulating signal into the frequency modulated output is minimized.

Another object of the present invention is to provide a multivibrator type modulator having improved linearity and high frequency response.

A further object of the invention is the provision of a multivibrator type modulator, which is simple to operate, highly stable and reliable, and economical to manufacture and maintain.

Further objects and advantages of the invention will become apparent by reference to the following description and accompanying drawing, wherein the sole figure is a schematic circuit diagram of a preferred embodiment of a wideband multivibrator type modulator.

Generally the disclosed modulator includes a free-running multivibrator, the frequency of which is varied in accordance with an input signal. The modulating means includes a pair of switching or amplifying means 10*a* and

10*b*, each of which has a substantially conducting state of operation and a substantially non-conducting state of operation. The switching means 10*a* and 10*b* are cross-coupled by cross-coupling means or capacitors 14*a* and 14*b*. A decoupling means 16 which includes a pair of diodes 16*a* and 16*b* is connected to the switching means or more particularly each diode is connected to one of the switching means 10*a* and 10*b* to decouple or disconnect one switching means from the other when one of the switching means is operative. The output of the switching means 10*a* and 10*b* are connected to an output means 18 for coupling the switching means 10*a* and 10*b* to the output in a push-pull fashion and in a manner that minimizes feedthrough. The output means 18 may typically comprise a center-tap traansformer.

More specifically in the embodiment of the invention shown in the accompanying drawing the input modulating signal which is a video or other wideband signal, is amplified by suitable video amplifier input means 10 which may be considered to include emphasizing circuitry for providing pre-emphasis and restoring or clamping circuitry for restoring a D.C. level to the input signal. The output of the video amplifier means 10 which is a direct current signal, varying in accordance with the input video signal, is coupled to the input terminal 12 of the free-running multivibrator 11 so as to vary the frequency thereof. In this connection, as more fully explained hereinafter the frequency of the multivibrator is controlled by varying the voltage applied to the switching means 10*a* and 10*b* in accordance with the output of the video amplifier means 10.

The illustrated multivibrator 11 comprises two similar cross-coupled circuits A and B, that is the output of each of these circuits is coupled to the input of the other circuit. For purposes of description, the parts of the left-hand circuit A in the drawing, hereinafter referred to as the left-hand circuit are indicated with a reference numeral and the subscript *a*. Corresponding parts of the other circuit B, the right-hand circuit in the drawing hereinafter referred to as the right-hand circuit are indicated with the same reference numeral and a subscript *b*.

Each of the circuits A and B includes a switching means or amplifying means 10*a* and 10*b* which in the illustrated embodiment is an NPN transistor 20*a* and 20*b*. Each transistor 20*a* and 20*b* is biased so as to operate either in a substantially nonconducting or a substantially conducting state. In this connection the collectors 22*a* and 22*b* are connected to a positive voltage source such as a 12 volt supply via a resistor 21, biasing or load resistors 24*a* and 24*b* and a pair of inductances 26*a* and 26*b*. The inductances 26*a* and 26*b* are adapted to minimize any amplitude modulation that occurs in the multivibrator 11. The emitters 30*a* and 30*b* are connected to ground via a pair of emitter resistors 32*a* and 32*b* and a first portion of the center-tap transformer 34*a* and a second portion 34*b*, respectively, of the primary 34P of the center-tap transformer 34. The primary winding 34P forms part of the output means or output transformer 18. The bases 36*a* and 36*b* are connected to the terminal 38 via biasing resistors 40*a* and 40*b*. The terminal 38 is part of a divider network 42 which includes the resistors 44 and 46. This divider network 42 functions to bias the bases 40*a* and 40*b* and cooperates with other circuit elements and the average input signal voltage to set the natural free-running frequency of the multivibrator 11.

The emitters 30*a* and 30*b* are connected to the input terminal 12 via a pair of diodes 16*a* and 16*b* which form the decoupling means 16 and a deviation equalization circuit means 50 which comprises a resistor 52 and a capacitor 54. The deviation equilization means 50 function to feed more of the information signal through to the emitters 30*a* and 30*b* at high frequencies. This equilization compensates for the tendency of the multivibrator 11 to be more difficult to deviate at higher frequencies. The diodes 16*a* and 16*b* are turned on when their respective switching means 10*a* and 10*b* is in a substantially conducting state. Since one of the switching means 10*a* or 10*b* is alternately nonconducting one of the diodes 16*a* or 16*b* is also alternately nonconducting and consequently the diodes 16*a* and 16*b* function to decouple or open-circuit the connection between switching means 10*a* and 10*b*.

The output from the multivibrator modulator is developed by the output means 18 which comprises a center-tapped transformer 34 having a primary 34P that is divided into a first portion 34*a* and a second portion 34*b* and a secondary 34S. The emitters 30*a* and 30*b* function to alternately energize the transformer primary 34P and more specifically the first portion 34*a* and the second portion 34*b*. The energization of the transformer primary 34P in this push-pull fashion energizes the transformer secondary 34S and develops the desired frequency modulated output signal which is fed to the RF output stages. The portion of transformer secondary 34S connected to ground is connected to a pair of decoupling capacitors 58 and 60 that enable the bleeder point terminal 38 and the power supply to be free of any RF signal developed in the circuit.

The invented multivibrator modulator can be readily understood by considering its operation. For the moment the modulated input signal, the deviation equalization means 50 and the decoupling means 16 will be disregarded. Considering the switching means 10*b* to be fully conductive and the switching means 10*a* to be at its initial or non-conduction state an output will be delivered to the second portion 34*b* of the transformer 34 via the emitter 30*b* of the transistor 20*b*. As the transistor 20*a* begins to conduct a negative going voltage will be transmitted from the collector 22*a* to the base 36*b* via the capacitor 14*b*. This negative going voltage tends to turn the transistor 20*b* off. The turning off of the transistor 20*b* transmits a positive going voltage to the base 36*a* via the capacitor 14*a* resulting in the turning on of the transistor 20*a* to a substantially conductive state and the turning off of the transistor 20*b*. Considering the voltage applied to the emitter to be constant the period for which the transistor 20*a* will remain on is substantially controlled or determined by the time that it takes for the capacitor 14*b* to charge via the resistor 40*b* to a positive potential relative to the emitter 30*b*. When this occurs the transistor 20*b* tends to turn on and the negative going voltage of the collector 22*b*, which is coupled to the base 36*a*, tends to turn the transistor 20*a* off. The transistor 20*b* will remain on until the capacitor 14*a* is charged to a positive potential by the voltage supply via a resistor 40*a*. When this occurs the transistor 20*a* will again turn on.

With the transistor 20*a* on, the diode 16*a* is based in the forward direction. When a sufficiently positive input signal transmitted through the on diode 16*a* via the deviation equilization means 50, the emitter 30*a* will also become positive and consequently the transistor 20*a* will turn off before it normally would turn off. The turning off of the transistor 20*a* reverse biases the diode 16*a* and turns the transistor 20*b* on before it would normally be turned on. With the transistor 20*b* turned on the diode 16*b*, that is reverse biased when the transistor 20*b* is off, will be forwardly biased and the transistor 20*b* is connected to the input terminal 12 and disconnected from transistor 20*a* by the reverse biasing of diode 16*a* by the off transistor 20*a*. The transistor 20*b* is now in condition to be prematurely switched off by thte input signal applied to the terminal 12. It should be understood that under usual operating conditions some average voltage is normally applied to the input terminal 12 by the input means 10. This average voltage contributes to the determination of the normal or natural free running multivibrator frequency. The deviation of the input voltage from the average voltage is effective to alter the normal frequency of the multivibrator frequency.

The output from the emitters 30*a* and 30*b* is applied to the transformer primary 34*b* in a push-pull fashion. This push-pull operation substantially minimizes or cancels any feed-through and amplitude modulation.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A multivibrator frequency modulator for accepting modulating input signals and supplying a frequency modulated output in response to the modulating input signals, the combination comprising:
   - a pair of switching means for alternately generating an output when energized, and including a pair of input electrodes;
   - cross-coupling means for cross-coupling one switching means to the other switching means;
   - power source means operatively coupled to the pair of switching means to alternately energize same at a predetermined rate;
   - decoupling means connected between said pair of input electrodes and the modulating input signals for selectively decoupling the switching means one from the other, and for alternately coupling the switching means to said modulating input signals upon energization of the respective switching means;
   - output means coupled to said input electrodes to provide said frequency modulated output, wherein the predetermined rate of energizing the switching means and thus said frequency modulated output is varied in response to the modulating input signals.

2. The multivibrator modulator of claim 1 wherein the switching means comprises a pair of transistors having emitter electrodes, wherein the pair of input electrodes of the switching means constitute said transistor emitter electrodes, said emitter electrodes being connected both to the modulating input signals via the decoupling means and to the output means.

3. The multivibrator modulator of claim 2 wherein said decoupling means further comprises a pair of diodes having cathode and anode electrodes, the cathode electrodes being commonly coupled to the modulating input signals, and anode electrodes being connected to the respective emitter electrodes of the transistors.

4. The multivibrator modulator of claim 3 wherein said output means further comprises a transformer having a primary and secondary, the primary being coupled to the emitter electrodes and having a center-tap thereon coupled to ground, the secondary being energized by the center-tapped primary in push-pull fashion to provide the frequency modulated output with a minimum of feed-through of the modulating input signal.

References Cited by the Examiner

UNITED STATES PATENTS

| | | | |
|---|---|---|---|
| 2,422,449 | 6/1947 | Usselman | 332—14 X |
| 3,077,567 | 2/1963 | Gray | 332—14 X |
| 3,204,200 | 8/1965 | White | 332—16 X |

ROY LAKE, *Primary Examiner.*

A. L. BRODY, *Assistant Examiner.*